(12) United States Patent
Zimmer

(10) Patent No.: US 6,286,174 B1
(45) Date of Patent: Sep. 11, 2001

(54) NOZZLE SYSTEM AND WINDSCREEN WIPER ARM FOR RECEIVING SAID NOZZLE SYSTEM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/342,000

(22) PCT Filed: Oct. 23, 1998

(86) PCT No.: PCT/DE98/03110

§ 371 Date: Jul. 22, 1999

§ 102(e) Date: Jul. 22, 1999

(87) PCT Pub. No.: WO99/28171

PCT Pub. Date: Jun. 10, 1999

(30) Foreign Application Priority Data

Dec. 2, 1997 (DE) .............................. 197 53 317
Apr. 4, 1998 (DE) .............................. 198 15 171

(51) Int. Cl.⁷ .................. B60S 1/32; B60S 1/52
(52) U.S. Cl. .................. 15/250.04; 15/250.351; 239/284.1
(58) Field of Search ............. 15/250.04, 250.351, 15/250.352, 250.01, 250.02, 250.03, 250.05; 239/284.1, 284.2

(56) References Cited

U.S. PATENT DOCUMENTS

| 5,239,726 | * | 8/1993 | Bianco | 15/250.351 |
| 5,327,614 | * | 7/1994 | Egner-Walter et al. | 15/250.04 |
| 6,094,772 | * | 8/2000 | West | 15/250.351 |

FOREIGN PATENT DOCUMENTS

| 1901407 | * | 8/1970 | (DE) | 15/250.05 |
| 3323004 | * | 1/1985 | (DE) | 15/250.04 |
| 4142163 | * | 7/1992 | (DE) | 15/250.351 |
| 689977 | * | 1/1996 | (EP) | 15/250.04 |
| 2047079 | * | 11/1980 | (GB) | 15/250.04 |

* cited by examiner

Primary Examiner—Gary K. Graham
(74) Attorney, Agent, or Firm—Michael J. Striker

(57) ABSTRACT

The invention relates to a nozzle arrangement (16) and to a windshield wiper arm (12) for receiving the nozzle arrangement (16). The nozzle arrangement has a delivery device (40) for a washer fluid that is connected to at least one first nozzle body (30) and can be disposed in the wiper arm (12) of the windshield wiper. It is proposed that the first nozzle body (30) is connected to a second nozzle body (32) in such a way that a first nozzle (32) of the first nozzle body (30) can be disposed in the vicinity of a hinge (22) for folding the wiper arm (12) out, and a second nozzle (36) of the second nozzle body (34) can be disposed in the vicinity of a connection means (28, 56) for connecting the wiper arm (12) to a wiper blade (14) in the wiper arm (12).

9 Claims, 4 Drawing Sheets

NOZZLE SYSTEM AND WINDSCREEN WIPER ARM FOR RECEIVING SAID NOZZLE SYSTEM

BACKGROUND OF THE INVENTION

The invention relates to a nozzle arrangement and a windshield wiper arm for receiving the nozzle arrangement. It is already known for water spray nozzles to be secured as additional components on the wiper blade and thus to enable distributing the water directly in the region of the wiper blade. This has the advantage that the hindrance division presented by the sprayed water is of only brief duration and is limited to a region concentrated in the vicinity of the wiper blade, which is wiped off again extremely quickly by the wiping motion. A disadvantage of such systems is that whether factors, and especially hail and extreme sunlight action, greatly influence the necessarily flexible parts of this arrangement for bridging the articulated regions between the wiper arm and the wiper blade. This shortens the surface life and lessons the reliability.

It is also known for these arrangements to be solidly go integrated with the windshield wiper arm, for instance with the connection piece to the wiper blade or in the fastening part secured to the wiper shaft. If such an arrangement fails, for instance because it becomes plugged up, broken, or the like, then the entire wiper arm has to be replaced.

SUMMARY OF THE INVENTION

It is therefore an object of the present invention to provide a nozzle arrangement which eliminates the disadvantages of the prior art.

In keeping with these objects, one feature of present invention resides, briefly stated, in a nozzle arrangement which has a first nozzle body connected to a second nozzle body so that a nozzle of the first nozzle body is disposed in the vicinity of the hinge for folding out a wiper arm, and a nozzle of the second nozzle body is disposed in the vicinity of the connection means for connecting the wiper arm to a wiper blade in the wiper arm, and the first and second nozzle body are solidly connected to one another.

The nozzle arrangement having the characteristics of the invention has the advantage that it enables optimal distribution of the sprayed water from two points far apart from one another on the wiper arm, and that it can be disposed replaceably inside the space enclosed by the wiper arm in a way that it is not visible from outside. The good replaceability of the known systems disposed on the wiper blade is thus combined with the properties of good protection and compactness of the permanently installed systems.

Also the nozzles can be replaced easily if the first and second nozzles are solidly joined together. This creates an easily manipulated structure that stays together. If the nozzle bodies are integrally joined together, preadjustment of the direction of the water stream is also possible. An economical embodiment is obtained if the nozzles can be made as a plastic injection-molded part.

The nozzle arrangement can be optimally supplemented with a heater, which extends both through the two nozzle bodies and through the device that connects the nozzle bodies. This is especially easily possible whenever the nozzle bodies are solidly joined together.

Simple installation, which can be performed even by someone not skilled in the art, is obtained if the nozzle bodies have means for clipping and/or detent-locking them in a wiper arm.

Advantageously, to receive the nozzle arrangement, a windshield wiper arm has a hinge for folding the windshield wiper out and a connection device for the wiper blade; a receptacle for the first nozzle body is provided in the vicinity of the foldout hinge, and a receptacle for the second nozzle is provided in the vicinity of the connection device for the wiper blade. Such a wiper arm also has the advantage that it can be disposed on motor vehicles even without a built-in nozzle arrangement, without being in the way of the driver's view. The nozzle arrangement can be installed by retrofitting, for instance by the vehicle owner, or can be mounted by the manufacturer before or after the windshield wiper arm is mounted on the vehicle.

To that end, the wiper arm has merely a small opening through which the washer fluid dispensed by a nozzle can flow, so that there is no visual impairment to a given technical function. For receiving the nozzle body, the windshield wiper arm may be bellied, and it is advantageous if the opening is made in a region of the bulge whose wall points toward the receptacle for the wiper blade. This makes it possible to aim the stream of sprayed water directly in front of the wiper blade in a lower region. By disposing the second nozzle the vicinity of the receptacle for the wiper blade, which is advantageously embodied as a hook-like receptacle in this narrow region, the distribution of the washing water over the windshield can be further optimized. This makes short stream lengths feasible, so that even at relatively high vehicle speeds, the oncoming wind has only little influence on the distribution of the sprayed water. The distribution of the sprayed water by the two streams of sprayed water preferably takes place along the length of the wiper arm or wiper blade, so that the view through the windshield is in fact impaired only minimally when the water is applied only upstream of the wiper blade in the wiping direction.

The hook-like receptacle grasps the nozzle body in clip-like fashion and holds it in position. It may be advantageous if the wiper blade to be disposed on the wiper arm has a recess for receiving the downward-protruding nozzle body. The nozzle body can then be designed with corresponding freedom, so that optimal washer fluid distribution through one or more built-in, adjustable nozzles is made possible. This increases the protection of the nozzle body from environmental factors.

BRIEF DESCRIPTION OF THE DRAWING

In the drawing, an exemplary embodiment of the nozzle arrangement of the invention and of a windshield wiper arm for receiving a nozzle arrangement is shown, and this is described in further detail below.

DESCRIPTION OF THE PREFERRED EMBODIMENTS

Figure 1:
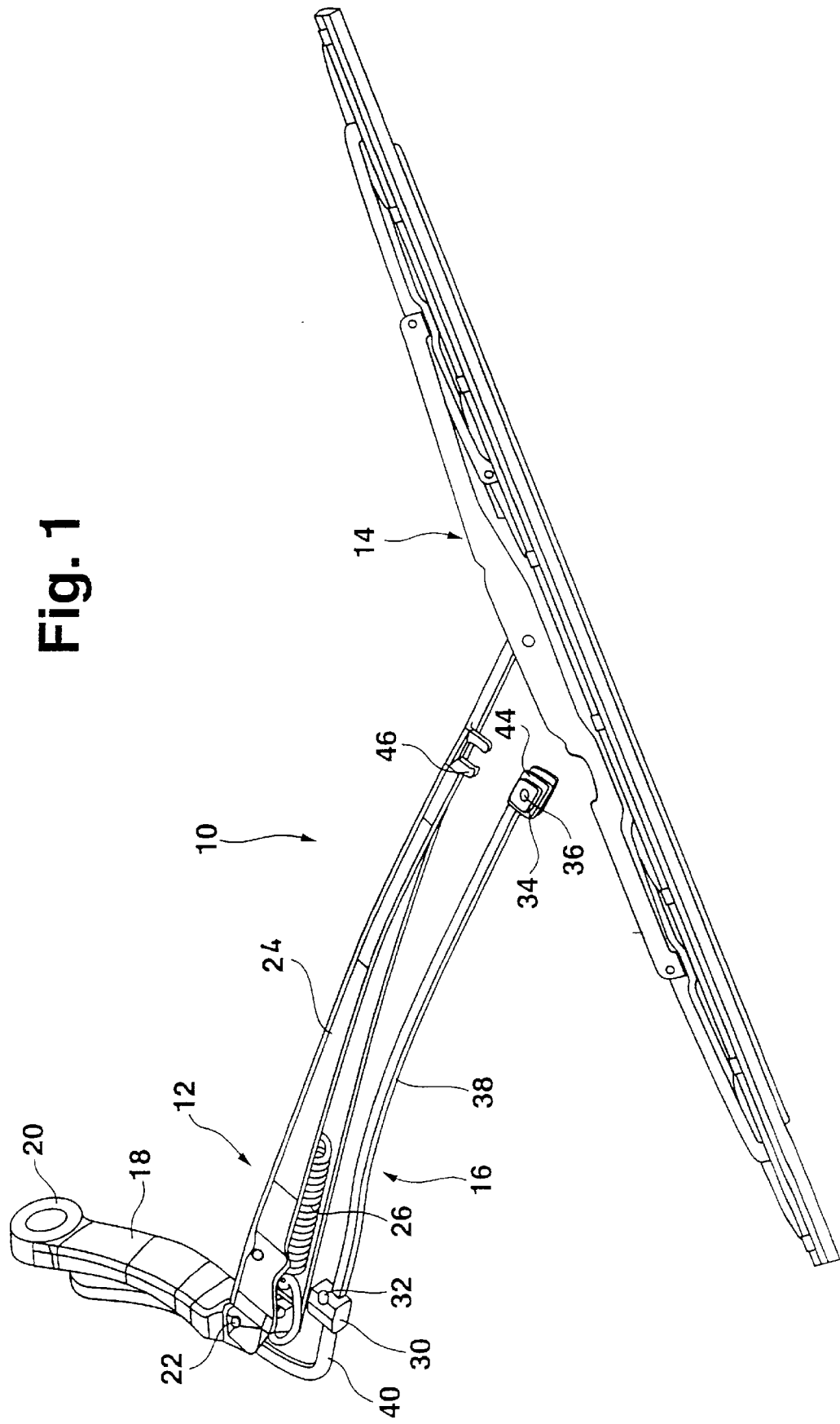
FIG. 1 shows a nozzle arrangement and a windshield wiper arm with a wiper blade attached.
Figure 2:
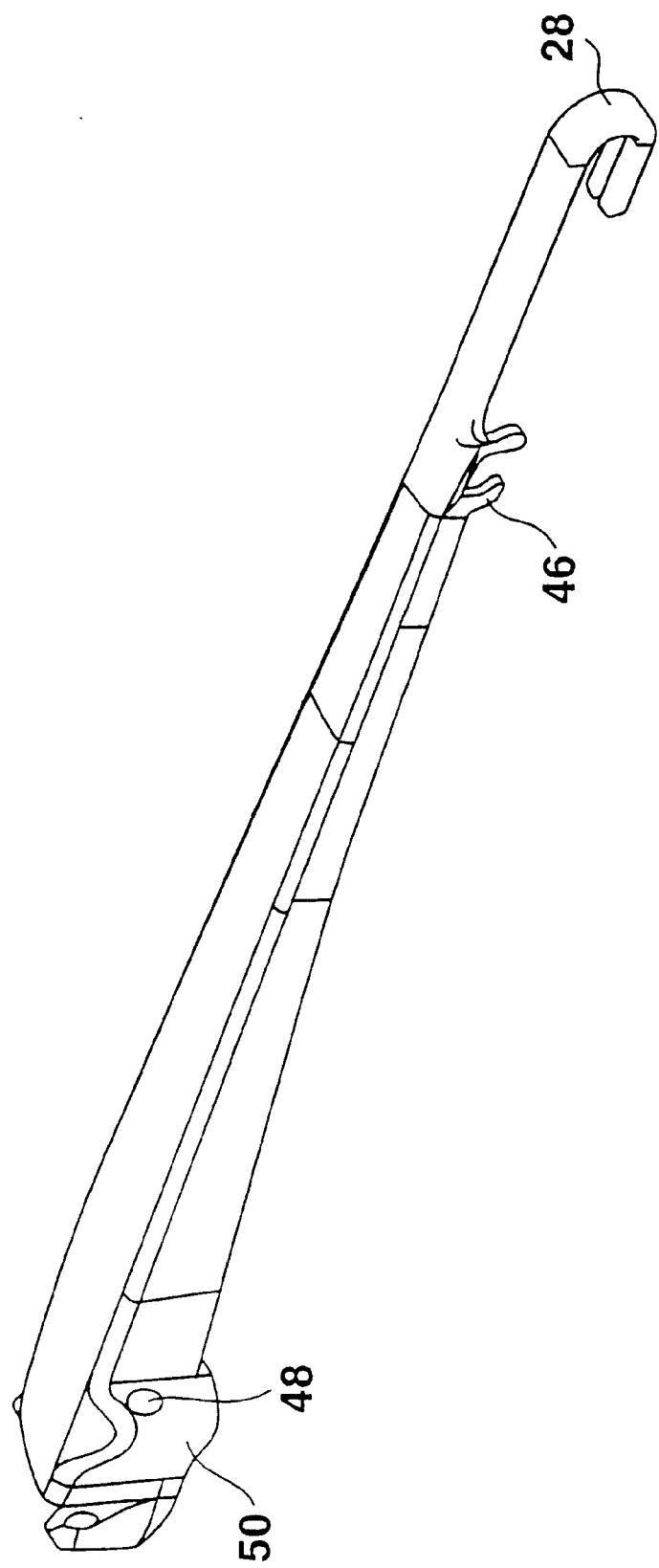
FIG. 2 shows a windshield wiper arm by itself.

In FIG. 1, a windshield wiper arm system 10 is shown, comprising a wiper arm 12, a wiper blade 14, and a nozzle arrangement 16. The wiper arm 12 comprises a fastening part 18, on which a receptacle 20 is molded for connection to a wiper shaft in a manner fixed against relative rotation, and on which fastening part, on the side opposite the receptacle 20, a hinge 22 is installed for receiving an elongated hinged element 24. The fastening part 18 and the hinged element 24 that is thus pivotably joined via the hinge 22 are urged toward one another by a spring 26, which on the one hand generates the requisite contact pressure for the wiping operation and on the other makes a stable foldout position (as shown) possible. For receiving the wiper blade 14, the hinged element 24 in the exemplary embodiment shown has a hook 28 (FIG. 2).

The nozzle arrangement 16 has a first nozzle body 30 with a first nozzle 32 and a second nozzle body 34 with a second nozzle 36, which are joined to one another via a device 38. For connecting the nozzle arrangement 16 to a supply container, not shown, that is equipped with a pump, the first nozzle body 30 is connected to a delivery hose 40.

The nozzle body 32 and the nozzle body 34 are connected via the device 38 in such a way that on the one hand they can be disposed in the vicinity of the hinge 22 and on the other in the vicinity of the connection means (hook 28) to the wiper blade in the wiper arm 12. To that end, the nozzle bodies are introduced from below into the space enclosed by the wiper arm. The wiper arm is of thin sheet steel and can be made economically as a bent and stamped part. The nozzle arrangement 16 is thus seated virtually invisibly inside the hinged element 24 of the wiper arm 12, and the delivery hose 40 extends in a known manner through the fastening part 18 to the supply container.

The device 38 that connects the two nozzle bodies 30 and 34 to one another can be hose-like, but in the exemplary embodiment it is embodied as a more-advantageous fixed connection. In this way, the two nozzle bodies 30, 34 are integrally connected to one another and are made as an injection-molded part. This creates a rigid construction that can be built into the wiper arm very simply.

Figure 3:
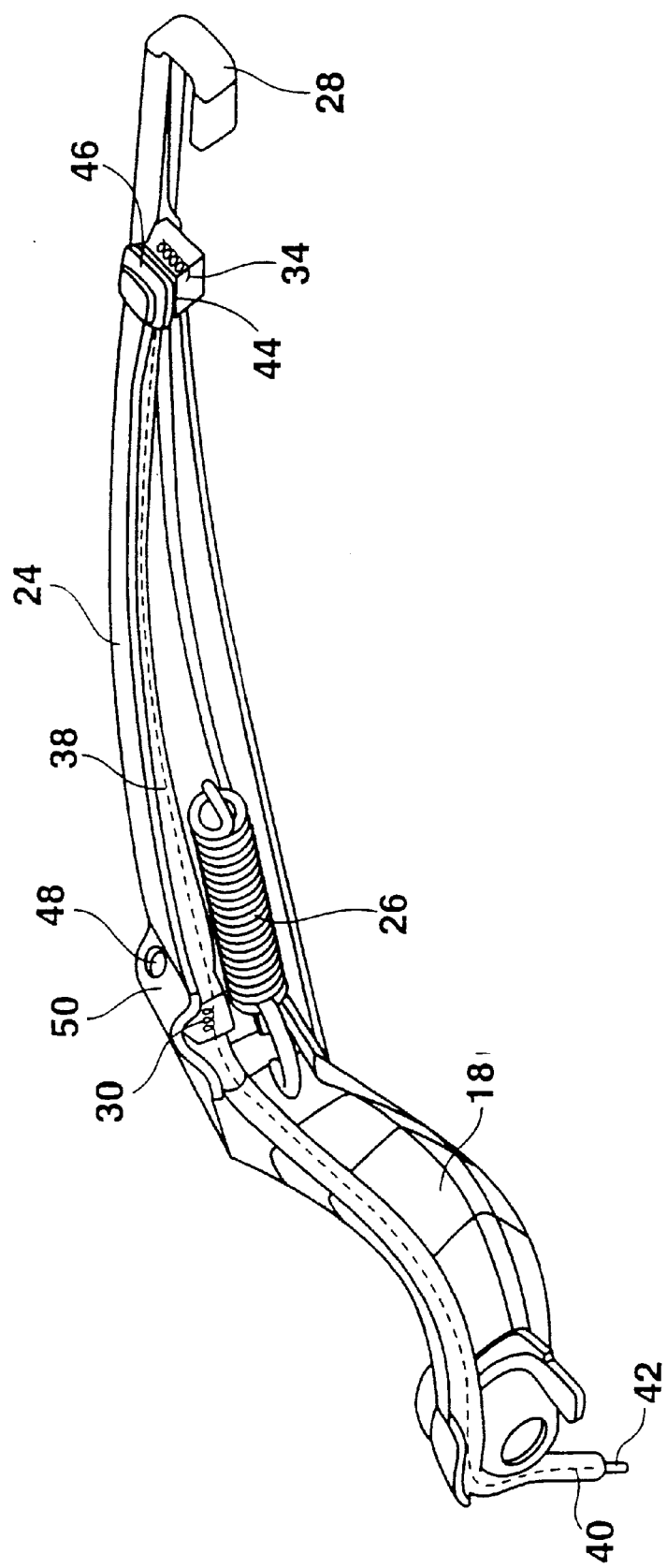
FIG. 3 shows a nozzle arrangement, built into a windshield wiper arm, seen from the underside of the windshield wiper arm.
Figure 4:
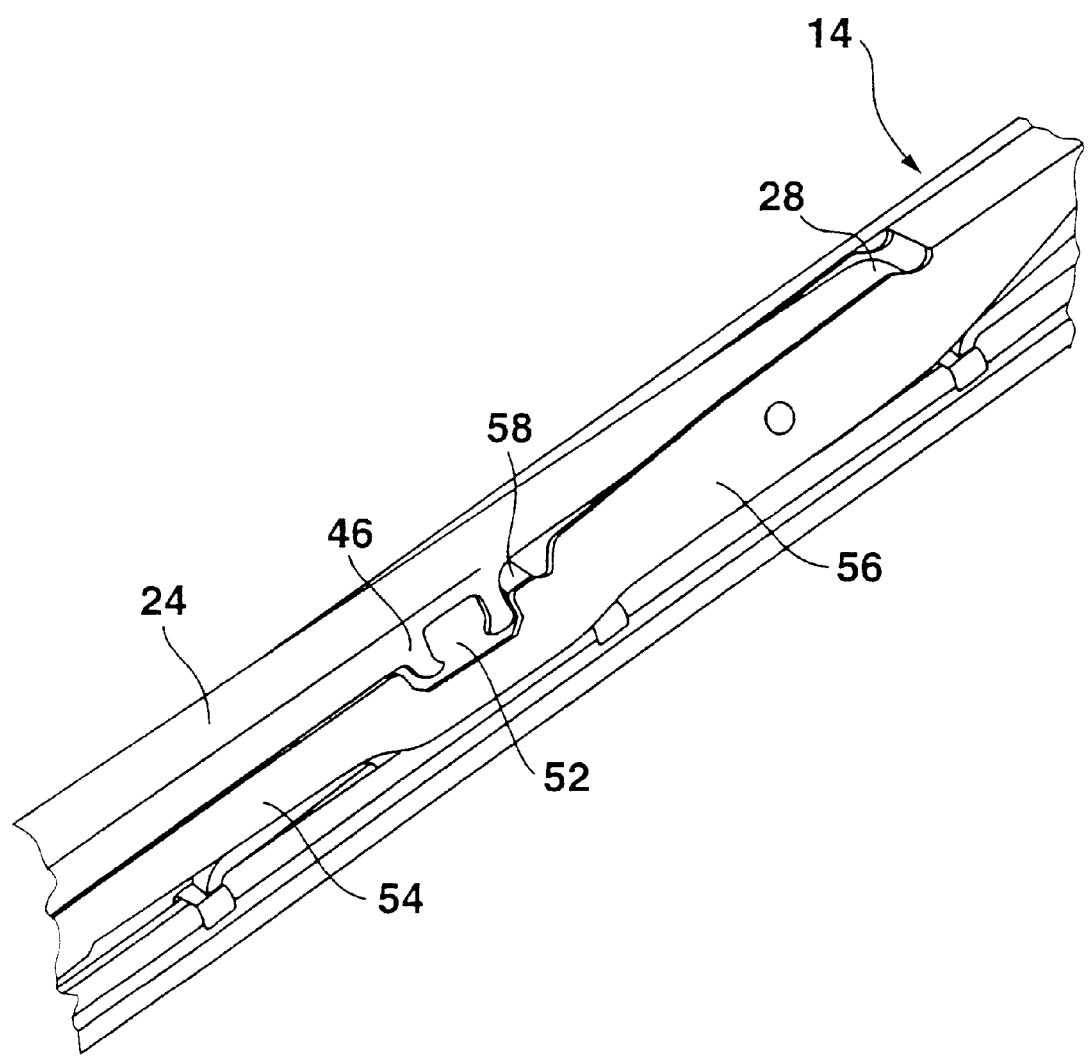
FIG. 4 shows a connection between a windshield wiper arm and a wiper blade on a larger scale, without a built-in nozzle arrangement.

A heater 42 (see FIG. 3) is integrated with the nozzle arrangement 16; it extends through the delivery hose 40 and the device 38 in the form of a wire, and is coiled through the nozzle bodies 30, 34.

The nozzle arrangement 16, and in particular the nozzle bodies 30, 34, have means 44 (shown in FIGS. 1 and 3 for the nozzle body 34), which are suitable for snapping or clipping the nozzle arrangement 16 into the wiper arm.

On its hinged element 24, the wiper arm 12 for that purpose have a hook-like receptacle 46, which in the working position of the windshield wiper system 10 extends toward the window to be washed and is open toward the bottom. Once the nozzle arrangement 16 has been built in, the receptacle 46 grasps the means 44 of the nozzle body 34. The means 44 is fluted and snaps into the receptacle 46. This assures a secure hold. Other detent means, not shown, are disposed in the region of the nozzle body 30.

While the nozzle 36 of the nozzle body 30, because of the type of receptacle 46, is opened toward the window, for the nozzle 32 disposed below the sheet-metal jacket of the hinged element 24, an opening 48 is provided through which the sprayed stream can emerge. The nozzle body 30 is surrounded by a bulge 50 of the hinged element 24. The opening 48 is made in the bulge 50 in the direction toward the wiper blade receptacle (hook 28).

For installation of the nozzle arrangement 16, the first nozzle body 30 is connected to the delivery hose 40, which is preassembled in the fastening part 18, and the nozzle arrangement 16 is then pressed from below into the hinged element 24 of the wiper arm 12 and locks in place. This can be done either before or after the windshield wiper system 10 is installed in the motor vehicle, or can be done completely separately and later by the later owner of the motor vehicle.

If as in the exemplary embodiment the hinged element 24 is embodied as quite narrow in the region of the second nozzle body 34 and the later-installed wiper blade 18 is guided closely along the hinged element, then a recess 52 should be provided in the main bracket 54 of the wiper blade 14, into which recess the receptacle 46 and the second nozzle body 34—once installed—can dip. For the sake of stability, a certain spacing between the recess 52 and the receptacle 56 of the hook 28 is assured. In this way, a stabilizing strut 58 can remain in the main bracket 54.

What is claimed is:

1. A combination of a windshield wiper and a nozzle arrangement for motor vehicles, comprising a windshield wiper with a wiper arm having a folding out hinge and a wiper blade attached thereto; and a nozzle arrangement including a delivery device for a washer fluid; at least one first nozzle body to which said delivery device is connected and which is disposed in said wiper arm of a windshield wiper; a second nozzle body connected with said first nozzle body so that a nozzle of said first nozzle body is disposed adjacent to the folding out hinge of the wiper arm, and a nozzle of said second nozzle body is disposed adjacent a connection means for connecting said wiper arm to said wiper blade, said wiper arm having two receptacles, and said first and second nozzle bodies being received in said receptacles and solidly connected to one another.

2. A combination as defined in claim 1, wherein said first and second nozzle bodies are fixedly connected with one another.

3. A combination as defined in claim 1, wherein the nozzle arrangement is formed as a plastic injection-molded part.

4. A combination as defined in claim 1, and further comprising a heater disposed inside said nozzle bodies and inside a device for connecting said nozzle bodies.

5. A combination as defined in claim 1, wherein said second nozzle body is provided with means for connecting said nozzle body to the wiper arm and comprises clipping means.

6. A combination of a windshield wiper arm and a nozzle arrangement, comprising a windshield wiper arm with a wiper blade attached thereto via a connection device and a foldout hinge, a nozzle arrangement having a delivery device and two nozzle bodies provided with nozzles, a first receptacle for a first one of said nozzle bodies and disposed adjacent said foldout hinge, and a second receptacle for a second one of said nozzle bodies and disposed adjacent said connection device.

7. A combination as defined in claim 6, and further comprising at least one opening in said wiper arm for a passage through said opening of washer fluid dispensed by at least one of said nozzles.

8. A combination as defined in claim 7, and further comprising said second receptacle being hook shaped.

9. A windshield wiper arm for receiving a nozzle arrangement having a delivery device and two nozzle bodies provided with nozzles, said windshield wiper arm comprising a hinge for folding out the windshield wiper arm, a connection receptacle for a wiper blade, a first receptacle for a first one of said nozzle bodies and disposed adjacent said foldout hinge, and a second receptacle for a second one of said nozzle bodies and disposed adjacent said connection receptacle, and a bulge which receives one of said nozzle bodies and has a wall pointing toward connection receptacle for the wiper blade and provided with an opening therein.

* * * * *